(12) United States Patent
Chesser (10) Patent No.: US 6,814,029 B1
(45) Date of Patent: Nov. 9, 2004

(54) DEER FEEDER

(76) Inventor: Bryan K. Chesser, 4050 58th Ave., Vero Beach, FL (US) 32966

( * ) Notice: Subject to any disclaimer, the term of this patent is extended or adjusted under 35 U.S.C. 154(b) by 0 days.

(21) Appl. No.: 10/114,461

(22) Filed: Apr. 3, 2002

Related U.S. Application Data (60) Provisional application No. 60/282,875, filed on Apr. 11, 2001.

(51) Int. Cl.[7] .............................................. A01K 5/00
(52) U.S. Cl. ................. 119/57.91; 119/57.92; 119/57.1; 222/239; 366/134; 366/155.2; 366/195
(58) Field of Search ..................... 119/52.1, 53, 57.1, 119/57.7, 57.92, 57.5, 57.6, 57.91, 51.01, 51.11, 51.04; 222/239, 240, 241; 366/155.2, 195, 134

(56) References Cited

U.S. PATENT DOCUMENTS

| | | | |
|---|---|---|---|
| 509,488 A | * 11/1893 | Potter .......................... 222/239 |
| 1,571,814 A | * 2/1926 | Stewart .................... 119/57.91 |
| 1,786,556 A | * 12/1930 | Arnold et al. .............. 241/247 |
| 1,960,030 A | * 5/1934 | Sackett ....................... 366/104 |
| 3,197,084 A | * 7/1965 | Van der Lely et al. ..... 222/254 |
| 3,225,742 A | * 12/1965 | Hagans .................... 119/51.11 |
| 3,420,452 A | * 1/1969 | Vaughan .................... 239/670 |
| 3,710,983 A | * 1/1973 | Ricciardi ................... 222/141 |
| 3,949,909 A | * 4/1976 | Sterner ....................... 222/199 |
| 4,027,627 A | * 6/1977 | Fillion ..................... 119/51.11 |
| 4,027,806 A | * 6/1977 | Weihmuller ................ 414/299 |
| 4,030,452 A | * 6/1977 | Keen et al. ................. 119/57.6 |
| 4,066,245 A | * 1/1978 | Shultz ......................... 366/139 |
| 4,279,221 A | * 7/1981 | Arvizu .................... 119/51.11 |
| 4,292,930 A | * 10/1981 | Olsen ..................... 119/51.11 |
| 4,345,858 A | * 8/1982 | Barlow ......................... 406/34 |
| 4,523,547 A | * 6/1985 | Ogasawara et al. ........ 119/57.6 |
| 4,890,577 A | * 1/1990 | Maibach .................... 119/52.1 |
| 4,949,879 A | * 8/1990 | Mariotti ...................... 222/413 |
| 5,050,537 A | * 9/1991 | Fox .......................... 119/51.02 |
| 5,230,300 A | * 7/1993 | Mezhinsky .............. 119/51.11 |
| 5,309,864 A | * 5/1994 | Harmsen et al. ......... 119/51.02 |
| 5,368,192 A | * 11/1994 | Ransom, II ................. 221/277 |
| 5,570,953 A | * 11/1996 | DeWall ....................... 366/10 |
| 5,724,912 A | * 3/1998 | Cull .......................... 119/57.2 |
| 5,858,429 A | * 1/1999 | Wallace ...................... 426/231 |
| 5,906,174 A | * 5/1999 | Muldoon ..................... 119/54 |
| 5,927,232 A | * 7/1999 | Pollock ....................... 119/53 |
| 5,964,184 A | * 10/1999 | Hart .......................... 119/57.1 |
| 6,109,553 A | * 8/2000 | Hruska .................... 241/189.1 |
| 6,149,080 A | * 11/2000 | Stout .......................... 239/682 |

FOREIGN PATENT DOCUMENTS

DE      19917462 A1 * 10/2000       A01C/15/04

* cited by examiner

*Primary Examiner*—Jack W. Keith
*Assistant Examiner*—James S. Bergin
(74) *Attorney, Agent, or Firm*—McDermott, Will & Emery, LLP (57) ABSTRACT

A game feeder utilizes an improved feed dispensing mechanism that allows feed to enter the feed dispensing mechanism from the side. A game feeder utilizing the improved feed dispensing mechanism prevents access to the feed through the feed dispensing mechanism thereby eliminating the need to keep the game feeder out of the reach of wild animals.

10 Claims, 10 Drawing Sheets

DEER FEEDER

RELATED APPLICATIONS

The present application claims priority from U.S. Provisional Patent Application Ser. No. 60/282,875, filed Apr. 11, 2001.

FIELD OF THE INVENTION

The present invention relates to game feeders, and in particular, to game feeders having an improved feed dispensing mechanism.

DESCRIPTION OF RELATED ART

Game feeders are used primarily to attract wild animals into certain areas and to supplement wild animals' diets. Game feeders are used to feed a variety of species ranging from large animals, such as deer, to fur bearing animals and even fish. During times when natural food sources are scarce, such as during a severe winter or a population boom, it is difficult for a herd of deer, or other animals, to find adequate food, and game feeders are used to supplement their natural diet. Game feeders are also used for recreational purposes to increase the likelihood of spotting a certain species in a certain area.

Major disadvantages of current game feeders are their high visibility, difficulty to set up, difficulty to fill, and uncontrolled feed dispersion pattern. These problems result from the feed dispersion mechanism, which must be kept out of wild animals' reach in order to prevent the animals from having unfettered access to the feed stored in the game feeder.

Wild animals are very sensitive to new and strange items appearing in their habitat, and, although a game feeder contains and disperses feed for the wild animals, its presence can disturb animals' natural habits and even frighten them away. Current game feeders are difficult to camouflage because their design requires a large structure that does not fit in well with animals' natural habitat. Available game feeders have a feed storage area that narrows at the bottom, usually into an inverted cone shape. The bottom portion of the feed storage area is positioned a slight distance away from the feed dispensing mechanism. Feed dispensing mechanisms typically have a motor and power source connected to a paddle, which is usually a flat disc that is roughly parallel to the ground and has raised paddles thereon, and a control element such as a timer or simple computer. Such feed mechanisms are well known in the art, and disperse small amounts of feed intermittently. Feed in the feed storage area is prevented from draining out by the close proximity of the feed dispensing mechanism to the opening at the bottom of the feed storage area When the feed dispensing mechanism is operated, the motor spins a disc with fins thereon to disperse feed randomly in a circular area. While the feed dispensing mechanism is operating, feed flows from the feed storage area to replace the feed that was resting on the disc, thus providing a constant supply of feed to be dispersed. When the feed dispensing mechanism stops, the feed resting on the disc prevents further feed from flowing out of the feed storage area. Such feed dispensing mechanisms need to be kept out of wild animals' reach because an animal could eat all of the feed in the feed storage area simply by eating the feed from the disc. One solution to prevent wild animals from having access to the feed on the disc was to place a wire cage around the feed dispensing mechanism, however some animals such as raccoons and squirrels can reach through the cage to the feed, thus depriving other animals such as deer of the feed.

Another solution to prevent access to the feed on the disc is to keep the entire game feeder out of reach of wild animals. This requires either hanging the feeder in a tree, or supporting the game feeder on long poles above the ground. For example, see U.S. Pat. No. 5,862,777. Hanging feeders in trees typically results in poor feed dispersion because of the proximity to the tree and the uncontrollable, circular feed dispersion that results in feed becoming caught in the tree or piled at the base of the tree. The major disadvantage of supporting the game feeder on poles is that the game feeder must be kept seven to twelve feet above the ground, resulting in a large structure that is difficult to camouflage. Additionally, game feeders on long poles are difficult to set up, especially in remote areas and/or on uneven terrain, and are difficult to fill with feed because of their height above the ground.

There is a need for reducing the visibility of a game feeder. There is also a need to provide a game feeder that delivers feed in a controlled direction. There is an additional need to provide a game feeder that is easy to set up and easy to refill.

SUMMARY OF THE INVENTION

The above needs, and others, are addressed by the present invention, which provides a game feeder with an improved feed dispersion mechanism. A paddle, for example a disc with raised fins thereon, is aligned to be substantially perpendicular to the ground when the game feeder is set up. The improved feed dispersion mechanism is also configured to prevent access to the feed without requiring the use of a cage and without requiring suspension of the game feeder at a great height above the ground.

Accordingly, one aspect of the invention relates to an improved feed dispensing mechanism. The improved feed dispensing mechanism comprises a housing and a paddle contained within the housing. A feed connector connected to the housing is configured to deliver feed to the paddle, and an agitator connected to the paddle is configured to prevent feed from flowing through the feed connector when the paddle is not moving and to enable feed to flow through the feed connector to the paddle when the paddle is moving.

Accordingly, another aspect of the invention relates to a game feeder. The game feeder comprises a feed source with a feed conduit connected to the feed source. A feed dispensing mechanism is connected to the feed conduit and comprises a housing and a paddle contained within the housing. The housing also comprises a feed connector that connects to the feed conduit. The feed conduit is configured to deliver feed to the paddle through the feed connector, and an agitator connected to the paddle is configured to prevent feed from flowing through the feed conduit when the paddle is not moving and to enable feed to flow through the feed conduit to the paddle when the paddle is moving.

DETAILED DESCRIPTION OF THE INVENTION

An improved game feeder and feed dispensing mechanism are described. In the following description, for the purposes of explanation, numerous specific details are set forth in order to provide a thorough understanding of the present invention. It will be apparent, however, to one skilled in the art that the present invention may be practiced without these specific details. In other instances, well-know structures and devices are shown in blocked-diagram form in order to avoid unnecessarily obscuring the present invention.

Current feed dispensing mechanisms allow direct access to the feed source and must be kept away from wild animals. The present invention prevents wild animals from accessing feed through the feed dispensing mechanism without requiring that the feed dispensing mechanism be kept out of wild animals' reach.

Figure 1:
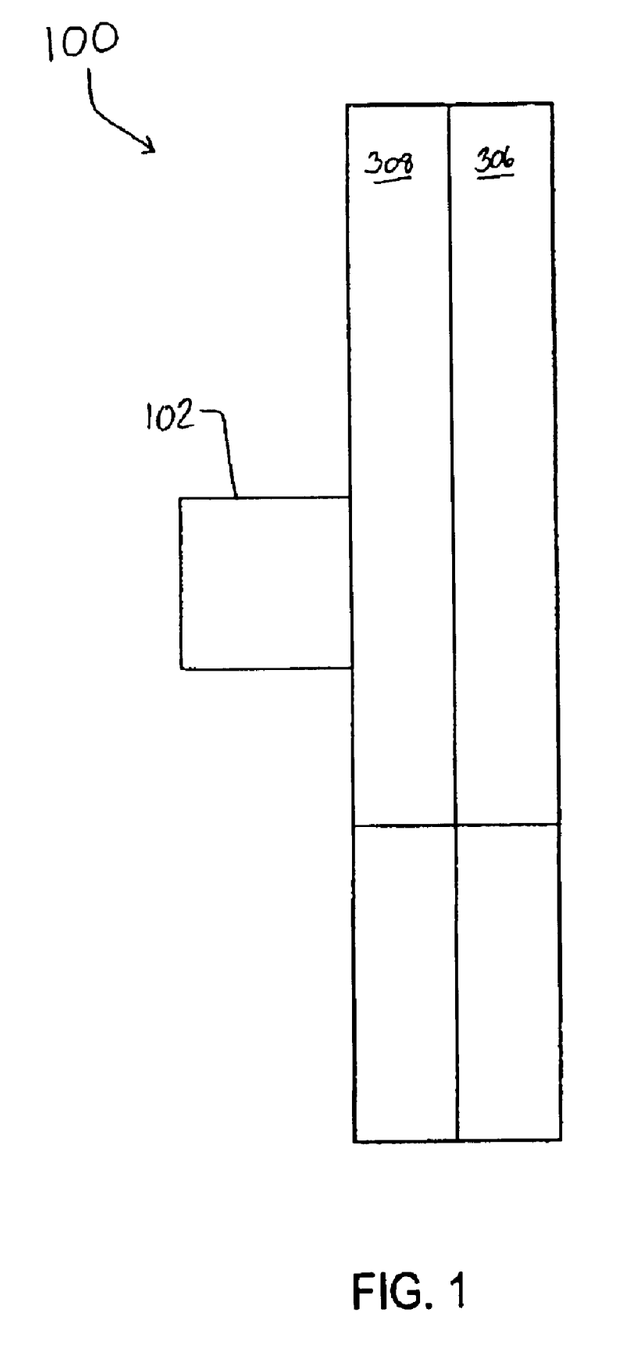
FIG. 1 depicts a front view of a housing of an embodiment of the present invention.
Figure 2:
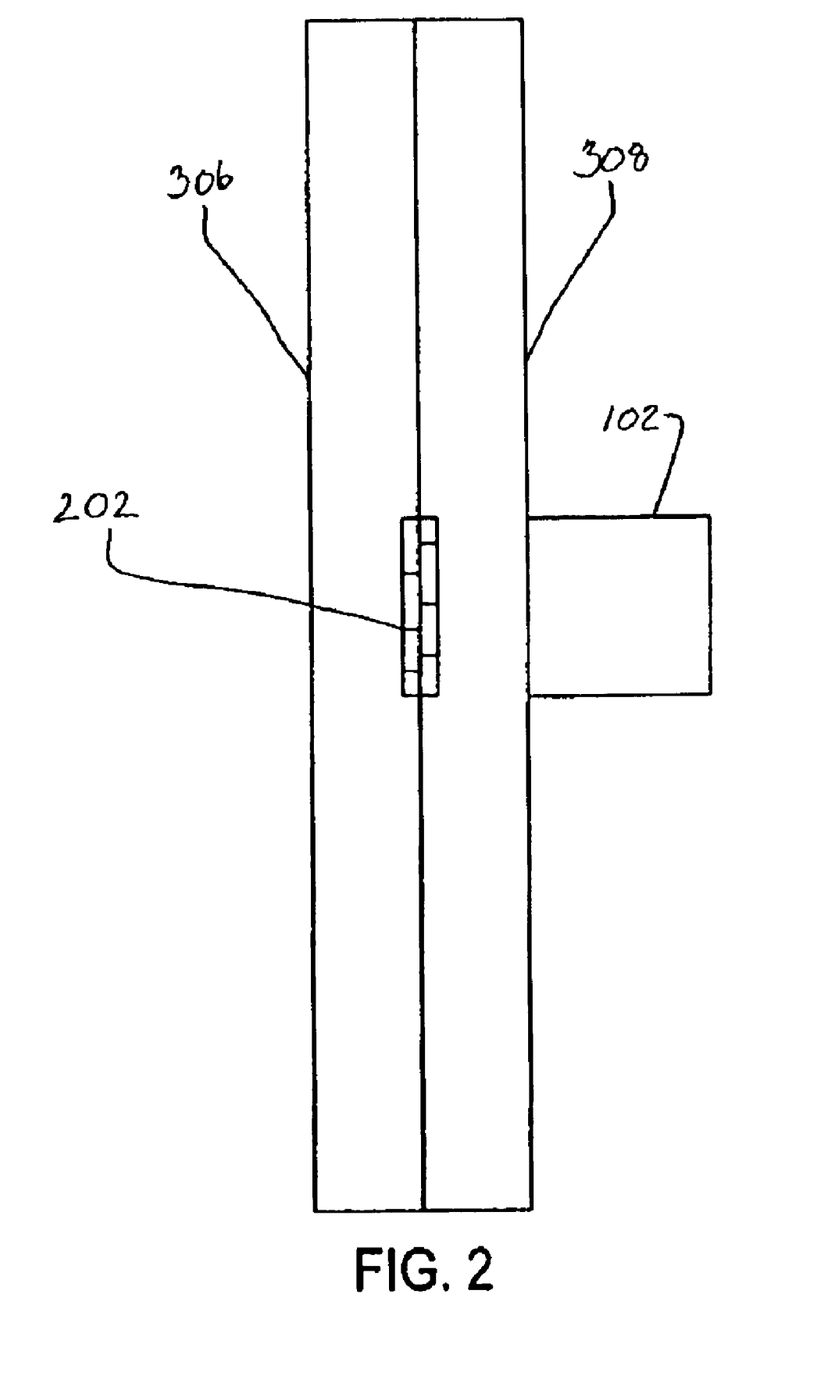
FIG. 2 depicts a rear view of the housing depicted in FIG. 1.

FIG. 1 depicts a housing 100 utilized with an embodiment of the present invention. The housing 100 comprises two halves, 306 and 308 (see FIG. 3), attached by a hinge 202 (see FIG. 2) and are held together in the closed position through internal resistance of the hinge 202. Housing 100 is made using a rigid material, for example, metal, plastic, wood, lucite, fiberglass, etc. Housing 100 also comprises a feed connector 102. The feed connector 102 is a structure that is configured to attach a feed conduit 1004/1002 (see FIG. 10) to the housing 100.

Figure 3:
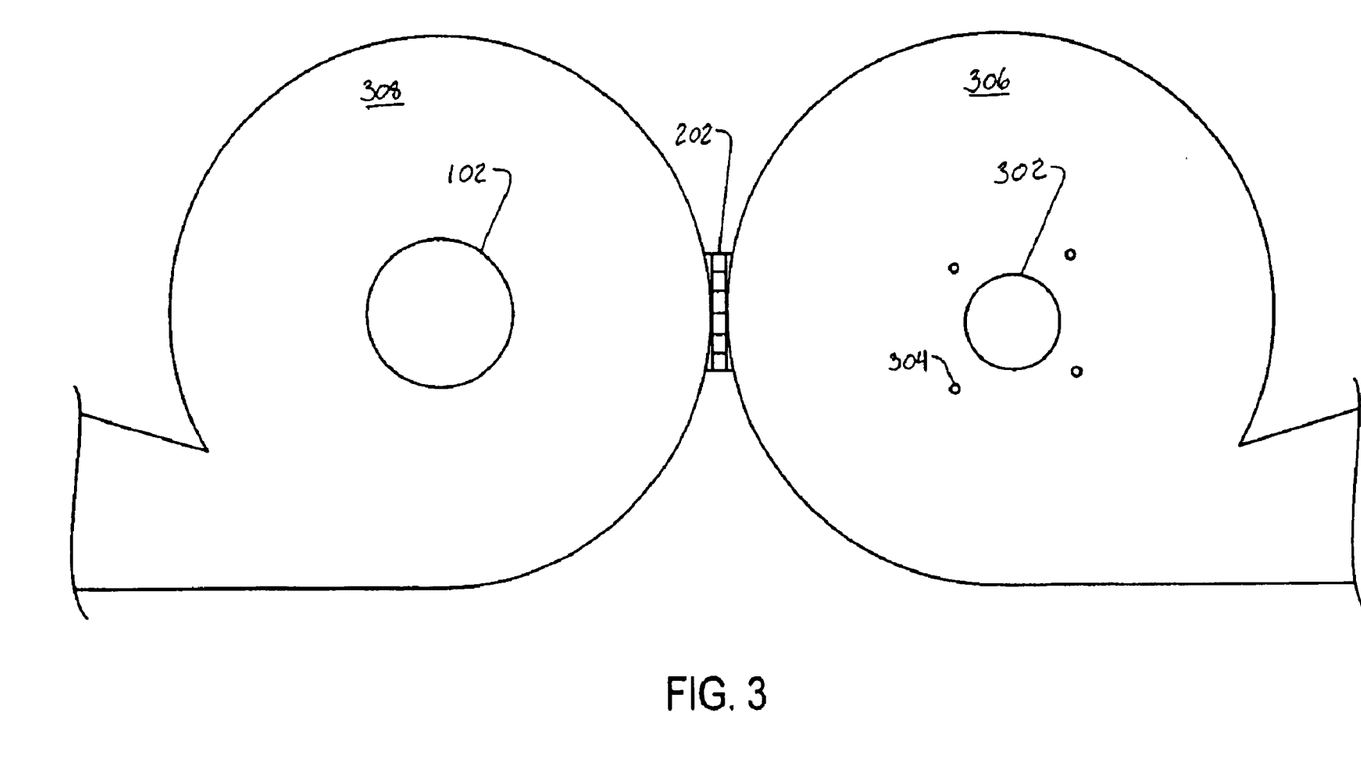
FIG. 3 depicts the housing depicted in FIG. 1 pivoted about a hinge to display the left and right sides of the housing.
Figure 4:
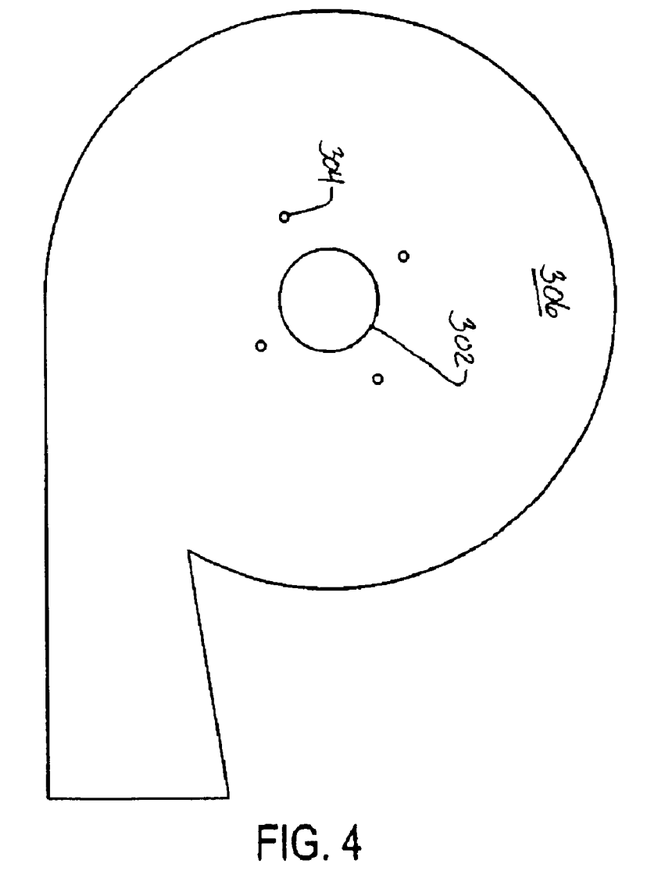
FIG. 4 depicts a left side of the housing depicted in FIG. 1.

Housing halves 306 and 308 are separable, or movably connected to one another, in order to permit a paddle 800 to be placed in the interior of housing 100. The paddle depicted in FIG. 8 comprises a disc 802 with fins 804 attached to one face of the disc 802. The fins 804 are attached to the disc 802 by rivets 806. Fins 804 can also be attached in any other manner, for example, by welding, screws, gluing, or can be formed integrally as part of disc 802. An aperture 808 in the center of disc 802 allows the paddle 800 to be attached to driveshaft extension 702 (see FIG. 7) as described in detail below. Paddle 800 is placed between housing halves 306 and 308 so that the fins 804 project towards housing half 308. Paddle 800 is made using a rigid material, for example, metal, plastic, wood, lucite, fiberglass, etc.

Figure 7:
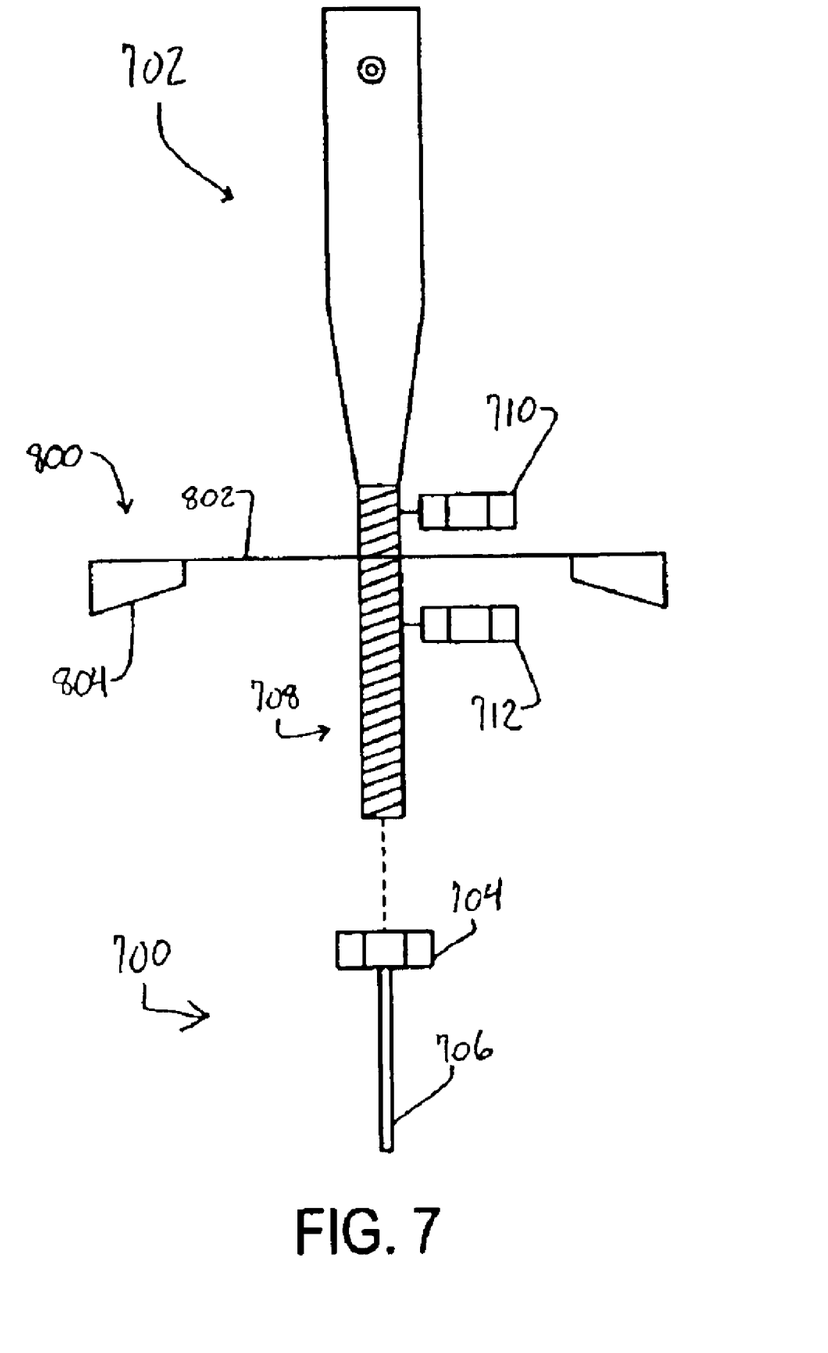
FIG. 7 depicts an assembly view of an agitator and paddle used with the embodiment of the present invention depicted in FIG. 1.

Referring to FIG. 7, attachment of the paddle 800 to the driveshaft extension 702 is described. For clarity, the housing 100 is not shown, however paddle 800 is placed proximate to housing half 306 so that the face of disc 802 without fins 804 thereon is adjacent the interior portion of housing half 306. Nut 710 is spun onto the threaded portion 708 of driveshaft extension 702. Driveshaft extension 702 is then inserted, threaded portion 708 first, through aperture 302 (see FIG. 3) in housing half 306, then through aperture 808 (see FIG. 8) in paddle 800. The nut 710 can be spun along the threaded portion 708 of driveshaft extension 702 to adjust the projection of driveshaft extension 702 through housing half 308 and paddle 800. Nut 710 directly contacts paddle 800. Once the driveshaft extension 702 has been properly adjusted using nut 710, nut 712 is spun onto the threaded portion 708 of driveshaft extension 702 and tightened against paddle 800 in order to lock paddle 800 into place. Driveshaft extension 702 is made using a rigid material, for example, metal, plastic, wood, lucite, fiberglass, etc., as are the nuts 710 and 712.

Still referring to FIG. 7, an agitator 700 is attached to driveshaft extension 702. The agitator 700 comprises an elongate, flexible portion 706 and an attachment portion 704. In the depicted embodiment, attachment portion 704 is a nut that is spun onto threaded portion 708 of driveshaft extension 702. Agitator 700 is made using a material that undergoes plastic deformation, i.e., will bend and return to its original position and shape once the bending force has been removed, for example, spring steel, plastics, rubber, etc.

Figure 8:
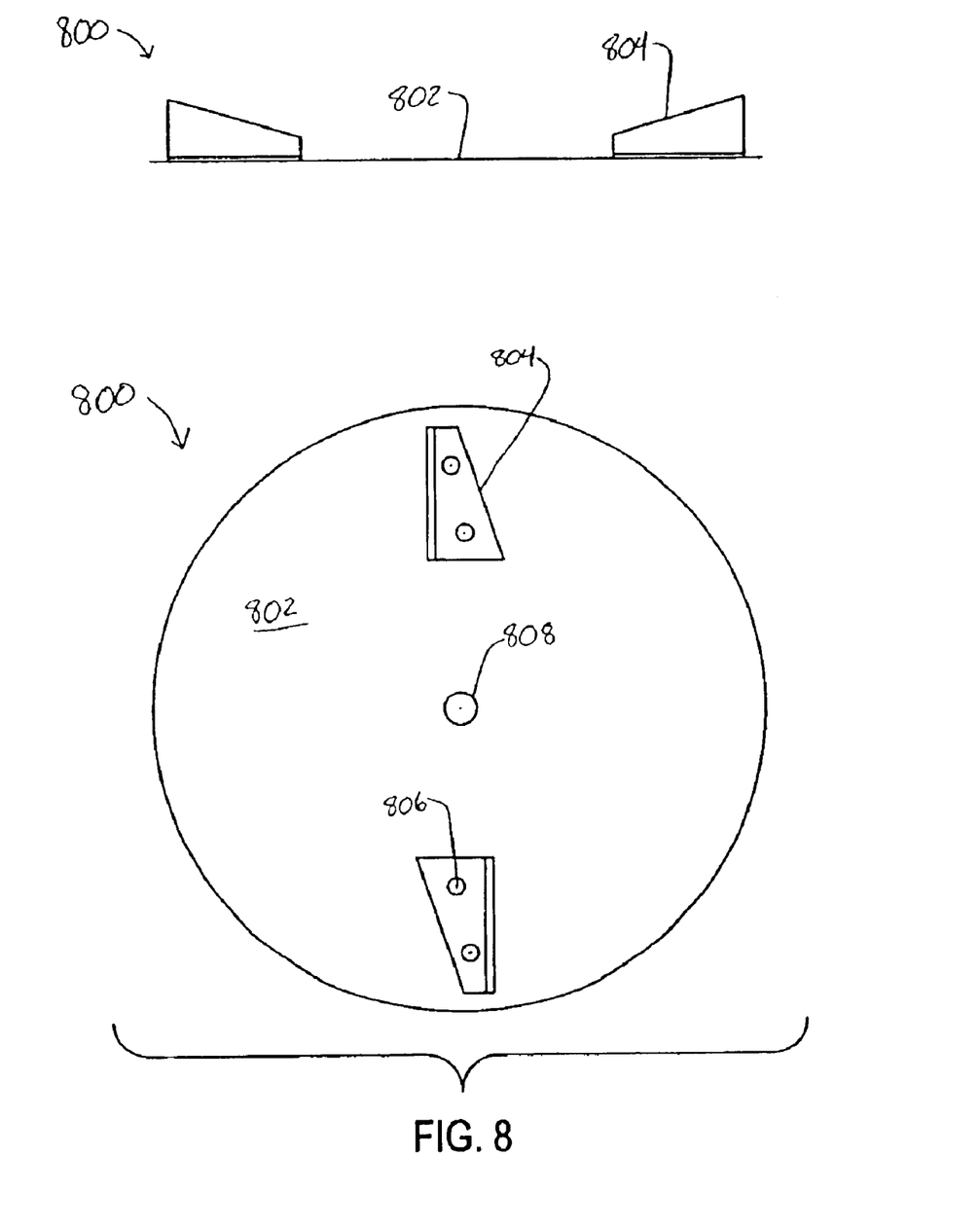
FIG. 8 depicts a top and front view of a paddle used with the embodiment of the present invention depicted in FIG. 1.

Once paddle 800, agitator 700 and driveshaft extension 702 have been assembled, or otherwise placed together, housing halves 306 and 308 are brought together. Housing halves 306 and 308 may be fastened to one another, but such fastening is not required.

Figure 6:
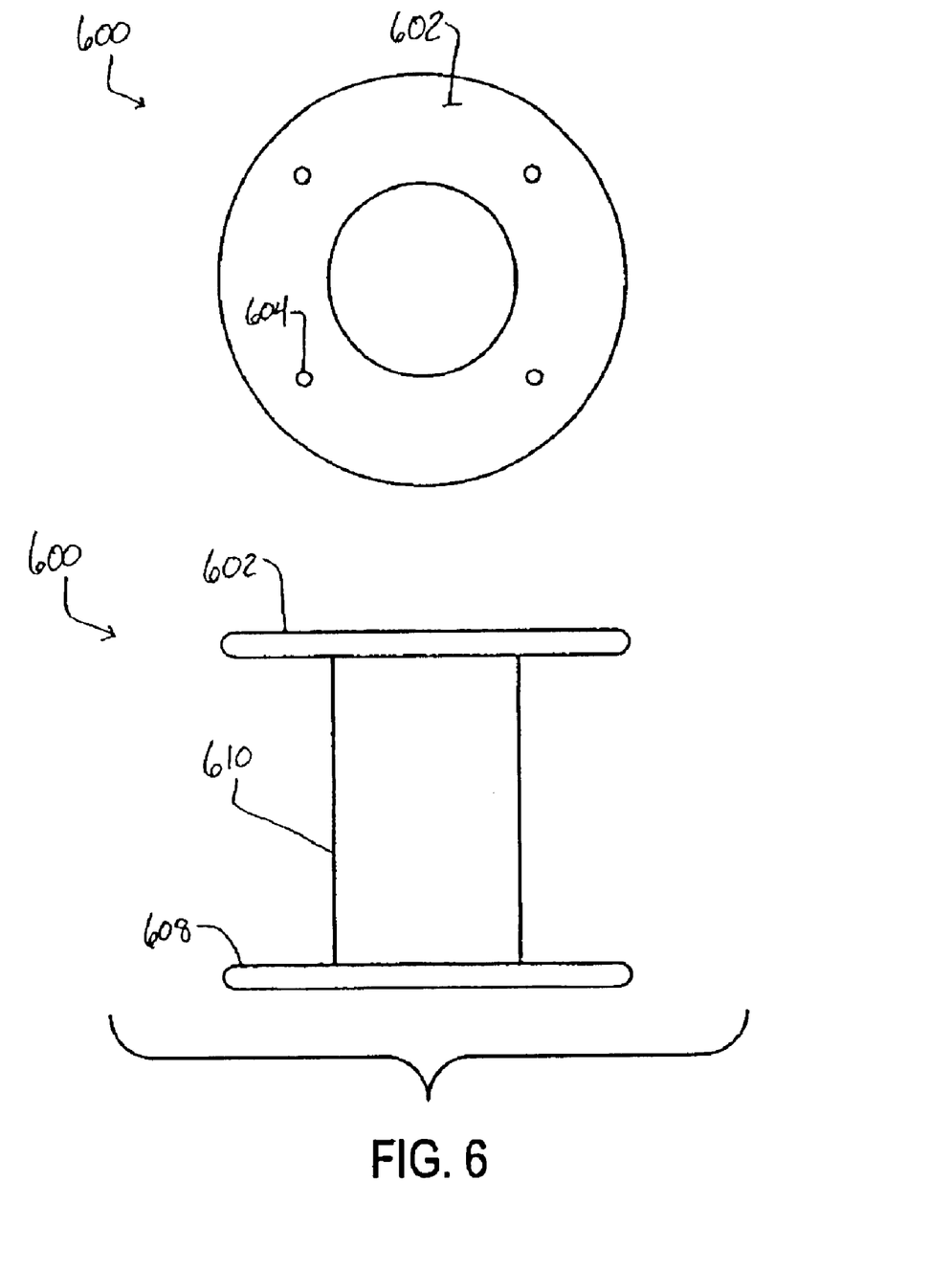
FIG. 6 depicts a front and side view of a motor-mount used with the embodiment of the present invention depicted in FIG. 1.
Figure 10:
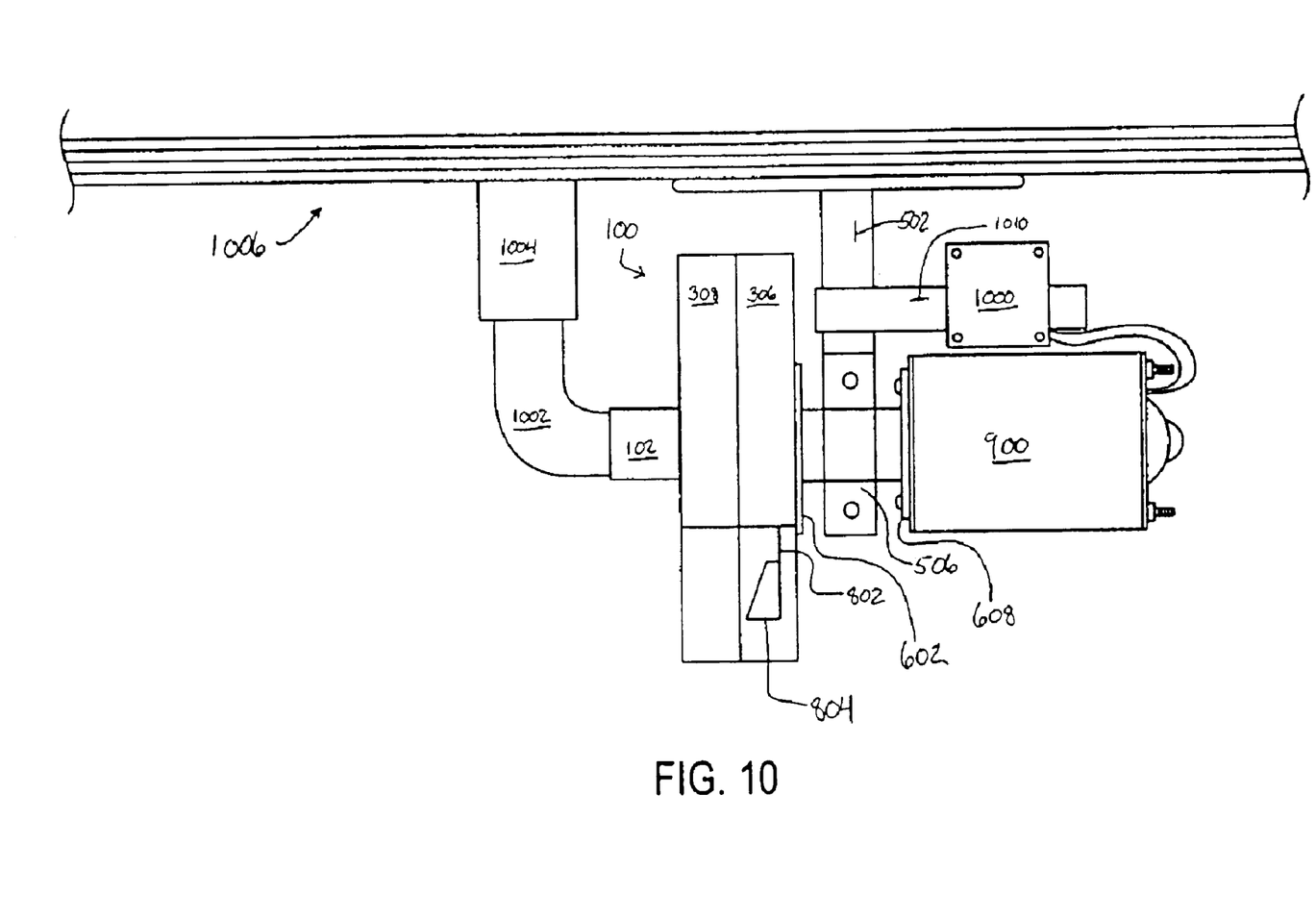
FIG. 10 depicts a feed dispensing mechanism in accordance with the embodiment depicted in FIG. 1.

Referring to FIGS. 6 and 10, motor-mount 600 is attached to housing half 306. Apertures 604 in flange 602 are aligned with apertures 304 (see FIG. 3) on housing half 306. Screws, rivets or other fasteners are passed through apertures 304/604 to secure motor-mount 600 to housing half 306. The inner portion 610 of motor-mount 600 is dimensioned to allow driveshaft extension 702 to pass therethrough. Driveshaft extension 702 rotates within portion 610. Grease can be used to reduce friction between portion 610 and driveshaft extension 702. Motor-mount 600 is made using a rigid material, for example, metal, plastic, wood, lucite, fiberglass, etc.

Figure 9:
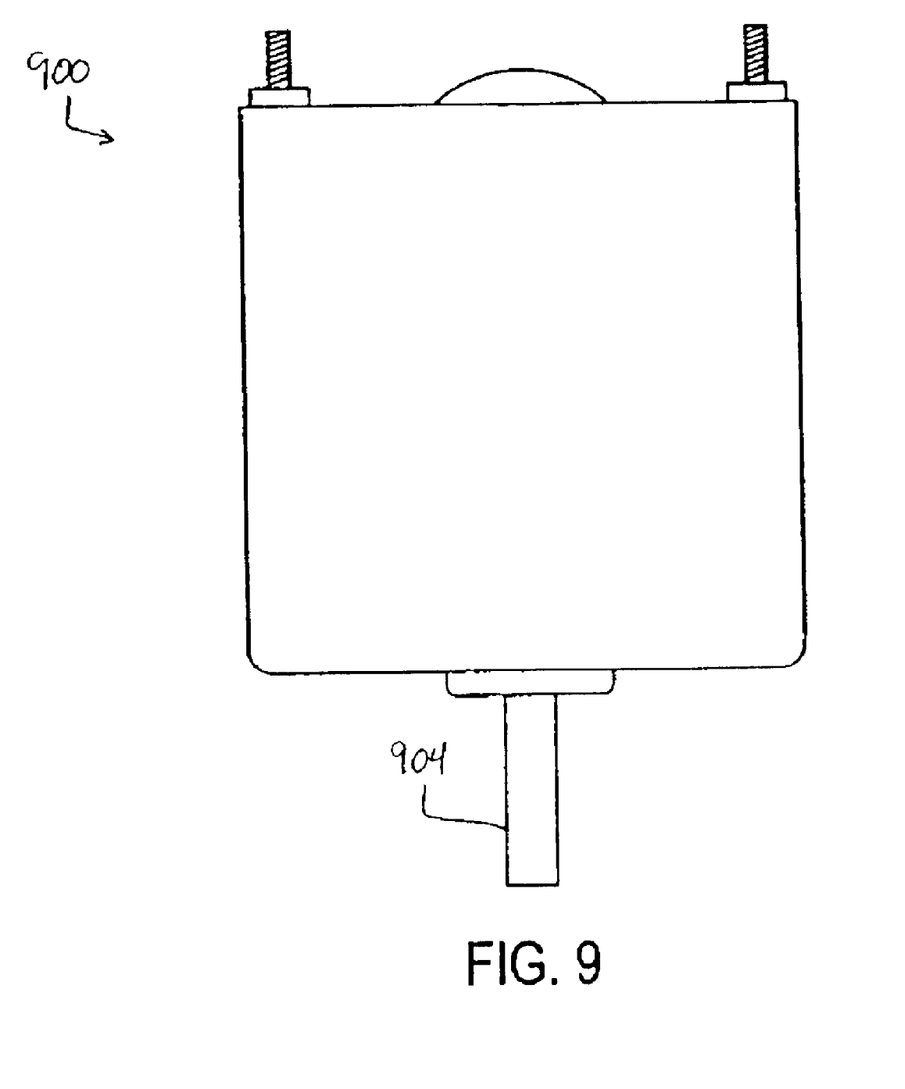
FIG. 9 depicts an electric motor used with the embodiment of the present invention depicted in FIG. 1.

Referring to FIGS. 7 and 9, driveshaft extension 702 is attached to an electric motor 900. The non-threaded end of driveshaft extension 702 is affixed to the driveshaft 904 of electric motor 900, for example, using a press fit or internal threads in a bore in the non-threaded end of driveshaft extension 702 and a threaded driveshaft 904 (preferably the threaded connection is such that when electric motor 900 turns driveshaft 904 the load on driveshaft extension 702 tightens the connection). When driveshaft extension 702 is connected to driveshaft 904, flange 608 (see FIG. 6) is placed against electric motor 900. Motor-mount 600 is attached to electric motor 900 by flange 608 just as flange 602 is attached to housing half 306, or in any well-known manner.

Figure 5:
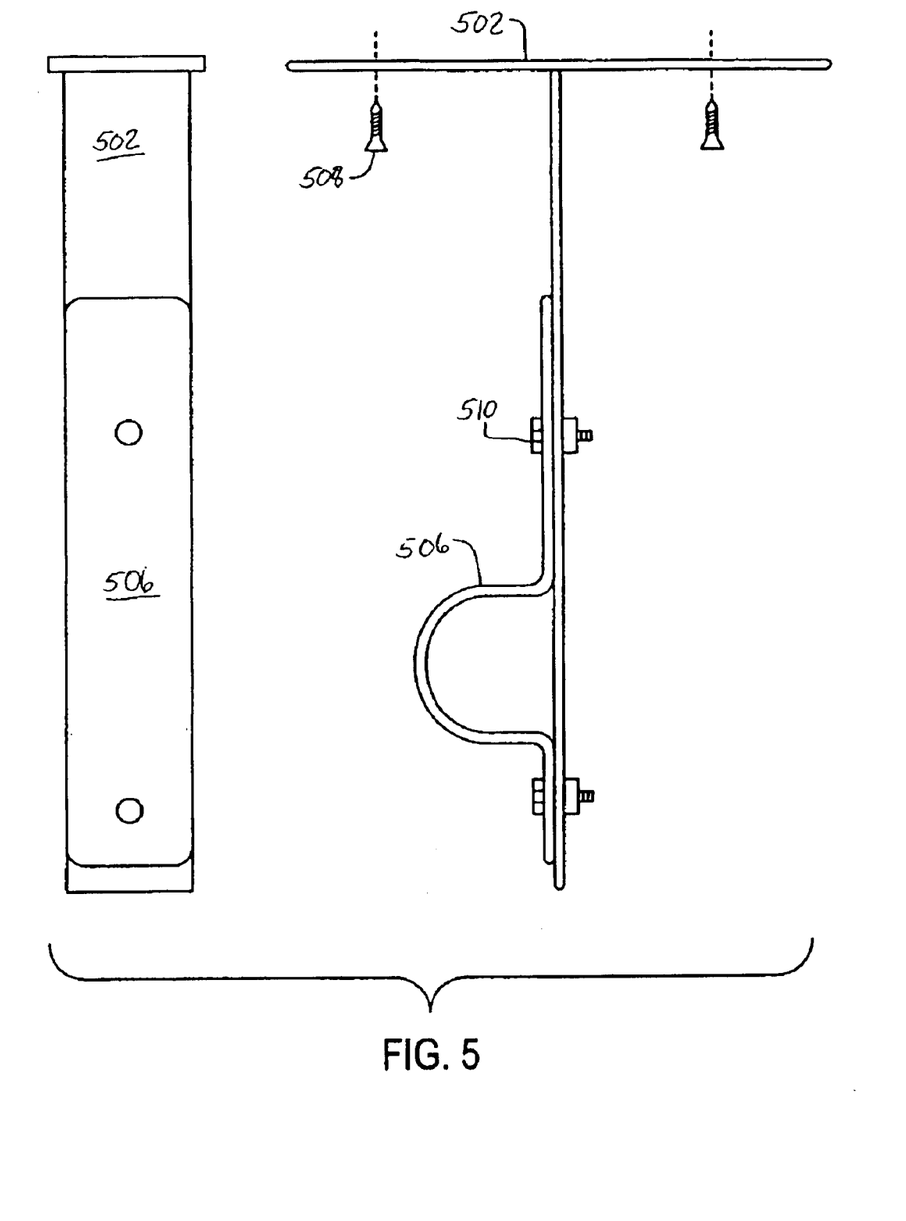
FIG. 5 depicts a front and side view of a bracket used with the embodiment of the present invention depicted in FIG. 1.

Referring to FIGS. 5 and 10, the housing/motor assembly described above is attached to a feed source 1006. Bracket portion 502, which is T-shaped, is attached to the bottom of feed source 1006 in any well-known manner, for example, using screws 508, or bolts, rivets, welds, glue, etc. Bracket portion 506 is placed over motor-mount 600 and then fastened to bracket portion 502 in any well-known manner, for example, using bolts 510, or screws, rivets, welds, glue, etc. Bracket 1010 is attached to bracket 500 in any well-known manner, for example, welds, rivets, screws, bolts, glue, etc. Bracket 1010 contains a power source and controller 1000 such as a battery and timer, or other power source for electric motor 900 and controller, such as a simple computer. Power source and controller 1000 is connected to electric motor 900 in any well-known manner. Brackets 500 and 1010 are made using a rigid material, for example, metal, plastic, wood, lucite, fiberglass, etc.

Referring to FIG. 10, feed from feed source 1006 is connected to the housing/motor assembly through a feed conduit comprising fitting 1004 and elbow 1002. Fitting 1004 is attached to the bottom of feed source 1006, for example, using threads, welds, glue, a flange and rivets/screws, etc. An aperture in the bottom of feed source 1006 opens the interior of feed source 1006 to the interior of fitting 1004. Elbow 1002 is attached to fitting 1004 in any well-known manner, for example, using threads, welds, glue, a flange and rivets/screws, etc. Elbow 1002 is then attached to feed connector 102 in any well known manner, for example, using threads, welds, glue, a flange and rivets/screws, etc. allowing feed to flow from the interior of feed source 1006 into housing 100.

Agitator 706 extends through housing 100 and feed connector 102 into elbow 1002. When electric motor 900 is off, agitator 706 prevents feed from flowing out of feed source 1002, through fitting 1004, elbow 1002, feed connector 102 and housing 102. Agitator 706 does not need to project all the way through feed connector 102 as long as it prevents feed from flowing. Because the feed is held in place by the agitator 706 in elbow 1002, it is safely out of reach of wild animals who would have to reach through housing 100, feed connector 102 and into elbow 1002 in order to reach the feed. A lid (not shown) on top of feed source 1006 prevents access by wild animals through the top of the game feeder.

When the controller in 1000 activates the power source in 1000 and causes electric motor 900 to start, agitator 706 turns, vibrates and loosens the feed within elbow 1002/feed connector 102. The turning and vibrating of agitator 706 causes feed to flow into housing 100. Because electric motor 900 is on, paddle 800 is also turning and disperses the feed out of housing 100 in a substantially linear pattern.

The feed dispensing mechanism depicted in FIG. 10 is easily attached to the bottom of a feed source 1006 (for example a 50 gallon drum, a 5 gallon bucket or other container for holding feed) and does not project far below the bottom of the feed source 1006 (less than 6 inches). Because wild animals cannot reach the feed through the feed dispensing mechanism, there is no need to support feed source 1006 high above the ground. All that is needed is enough clearance for the feed dispensing mechanism, ideally ½ a foot to 2 feet. Feed source 1006 is supported using any well-known structure (not shown) such as legs, a cylindrical structure with a cut out to allow feed dispensing, etc.

In alternate embodiments, the housing halves 306 and 308 are held together using any mechanism that does not interfere with the paddle 800 (see FIG. 8) that is surrounded by the housing 100. For example, clasps, buckles, VELCRO, posts on one half that mate with holes in the other half, etc. are used to secure housing halves 306 and 308 together. Additionally, the housing halves 306 and 308 do not need to be held together as the assembled feed dispensing mechanism will hold the housing halves 306 and 308 together.

In another embodiment, the housing halves 306 and 308 are not hinged together, but are releasable with respect to one another in order to permit access to the interior of housing 100.

In other embodiments the paddle comprises a series of flattened spokes attached about a hub.

In yet other embodiments, the feed connector 102 ranges from a fitting as depicted in FIG. 1 to a series of apertures that permit a feed conduit 1004/1002 to be attached to the housing 100.

Further embodiments comprise a driveshaft extension 702 attached to paddle 800 in other manners from that described above. For example, a small flange welded onto driveshaft extension 702, or formed as part of driveshaft 702, that fits through aperture 302 is used to either weld paddle 800 to the flange, or attach paddle 800 with fasteners such as rivets or screws. Paddle 800 is welded directly to driveshaft extension 702 or formed integrally with driveshaft extension 702 in other embodiments, which then requires insertion of driveshaft 702 through housing half 308 in a manner reverse to that described above.

In other alternate embodiments, attachment portion 704 is welded or otherwise attached to driveshaft extension 702. Alternatively, agitator 700 is formed integrally with driveshaft extension 702.

In further embodiments, motor-mount 600 is attached to housing half 306 in any well-known manner, for example studs on the housing half 306 are passed through apertures 604 and used to secure flange 602, or flange 602 is welded or glued to housing half 306. In additional embodiments, ball bearings are inserted within portion 610 to reduce friction between portion 610 and driveshaft extension 702.

In yet other embodiments, power sources and motors other than a battery and an electric motor are used. For example, a fuel-cell, solar cells and electric motor, etc.

Other, alternate embodiments utilize any conduit structure that conveys feed from the feed source 1006 to the feed dispensing mechanism. For example, flexible hosing, piping, etc. Conduit materials include rigid materials such as polyvinylchloride (PVC), metal, plastics, wood, etc., and flexible materials such as rubber, polyethelyne, etc.

A game feeder according to the present invention can be placed close to the ground and have the feed dispersed in a predictable manner. This allows a game feeder according to the present invention to be easily concealed, to be easily filled, and easily set up. Because the direction of the feed dispersion is known, a game feeder according to the present invention can be placed close to, or suspended from, flora without having the feed becoming accumulated in the flora.

While this invention has been described in connection with what is presently considered to the most practical and preferred embodiments, the invention is not limited to the disclosed embodiments, but on the contrary, is intended to cover various modifications and equivalent arrangements included within the spirit and scope of the appended claims.

What is claimed is:

1. A feed dispensing mechanism comprising:

a housing;

a paddle contained in the housing, configured to disperse feed away from the housing in a predictable pattern, and defining an axis of rotation configured to be substantially parallel to the ground when the paddle rotates;

a feed connector connected to the housing and configured to deliver feed to the paddle; and an agitator connected to the paddle and configured to prevent feed from flowing through the feed connector when the paddle is not rotating and to enable feed to flow through the feed connector to the paddle when the paddle is rotating.

2. The feed dispensing mechanism according to claim 1, further comprising:
   a motor connected to the paddle.

3. The feed dispensing mechanism according to claim 2, further comprising:
   a power source connected to the motor.

4. A game feeder comprising:
   a feed source;
   a feed conduit connected to the feed source; and
   a feed dispensing mechanism connected to the feed conduit comprising:
      a housing;
      a paddle contained in the housing, configured to disperse feed away from the housing in a predictable pattern, and defining an axis of rotation configured to be substantially parallel to the ground when the paddle rotates;
      a feed connector that connects to the feed conduit, the feed conduit configured to deliver feed to the paddle through the feed connector; and
      an agitator connected to the paddle and configured to prevent feed from flowing through the feed conduit when the paddle is not rotating and to enable feed to flow through the feed conduit to the paddle when the paddle is rotating.

5. The game feeder according to claim 4, further comprising:
   a structure that supports the game feeder above the ground.

6. The game feeder according to claim 4, further comprising:
   a motor connected to the paddle.

7. The game feeder according to claim 6, further comprising:
   a power source connected to the motor.

8. A game feeder comprising:
   a feed source;
   means for connecting the feed source to a feed dispensing mechanism; and
   a feed dispensing mechanism comprising:
      a housing;
      means within the housing for dispersing feed away from the housing in a predictable pattern; and
      means for preventing feed from flowing from the feed source when the dispersing means is stationary and for enabling feed to flow from the feed source when the dispersing means is in motion;
         wherein the dispersing means is configured to rotate about an axis of rotation, and the axis of rotation is defined as being substantially parallel to the ground when the dispersing means is rotating.

9. The game feeder according to claim 8, further comprising:
   means for supporting the game feeder above the ground.

10. The game feeder according to claim 8, further comprising:
   means connected to the dispersing means for moving the dispersing means.

* * * * *